United States Patent
Sinquin et al.

(10) Patent No.: US 6,208,598 B1
(45) Date of Patent: Mar. 27, 2001

(54) ANTI-COUNTERFEIT COMPACT DISC

(75) Inventors: Patrice Sinquin, Kibbutz Galuyot; Philippe Selve; Ran Alcalay, both of Tel Aviv, all of (IL)

(73) Assignee: Midbar Tech (1998) Ltd., Tel Aviv (IL)

( * ) Notice: Subject to any disclaimer, the term of this patent is extended or adjusted under 35 U.S.C. 154(b) by 0 days.

(21) Appl. No.: 09/229,812

(22) Filed: Jan. 13, 1999

(30) Foreign Application Priority Data

Nov. 16, 1998 (IL) .......................................... 127091

(51) Int. Cl.$^7$ ....................................................... G11B 5/09
(52) U.S. Cl. .................................. 369/47.12; 369/124.05; 369/124.07
(58) Field of Search .................................. 369/47, 48, 49, 369/53, 54, 58, 59, 84, 85, 124.05, 124.07; 360/15, 25, 27, 60

(56) References Cited

PUBLICATIONS

"Compact Disc Digital Audio System", International Electrotechnical Commission, International Standard, First Edition, 1987.
"CD–ROM and its Technology", No. 36, pp. 559–600.
"Information Technology—Data Interchange on Read–Only 120 mm Optical Data Disks (CD–ROM)", International Standard, ISO/IEC 10149, Second Edition. (1995).

*Primary Examiner*—Paul W. Huber
(74) *Attorney, Agent, or Firm*—Ladas and Parry

(57) ABSTRACT

A method for recording audio data onto a compact disc so as to discourage unauthorized copying thereof, the method including sampling a source audio data stream to determine at least one source audio data portion thereof the a derivative function of a sequence of samples of the source audio data portion is substantially constant, modifying the source audio data stream by substituting the source audio data portion with a substitute audio data portion, recording the modified audio data stream into at least one frame of the compact disc the frame has a P-channel, and setting the value of the P-channel that corresponds to the substitute audio data portion to 1.

5 Claims, 4 Drawing Sheets

US 6,208,598 B1

ANTI-COUNTERFEIT COMPACT DISC

FIELD OF THE INVENTION

The present invention relates to compact disc technology in general, and in particular to methods and apparatus for recording audio data onto a compact disc (CD) so as to discourage unauthorized duplication thereof.

BACKGROUND OF THE INVENTION

Measures currently known or proposed in the art for preventing the unauthorized duplication of compact discs are generally limited to marking compact discs in order to identify a counterfeit copy and trace it back to its point of origin. The primary disadvantage of such measures is that they provide no technical deterrent to duplicating compact discs.

The disclosures of all publications mentioned in this specification and of the publications cited therein are hereby incorporated by reference.

SUMMARY OF THE INVENTION

The present invention seeks to provide novel methods and apparatus for recording audio data onto a compact disc so as to discourage unauthorized duplication thereof which overcomes the known disadvantage of the prior art as discussed above.

There is thus provided in accordance with a preferred embodiment of the present invention a method for recording audio data onto a compact disc so as to discourage unauthorized copying thereof, the method including sampling a source audio data stream to determine at least one source audio data portion thereof the a derivative function of a sequence of samples of the source audio data portion is substantially constant, modifying the source audio data stream by substituting the source audio data portion with a substitute audio data portion, recording the modified audio data stream into at least one frame of the compact disc the frame has a P-channel, and setting the value of the P-channel that corresponds to the substitute audio data portion to 1.

Further in accordance with a preferred embodiment of the present invention the modifying step includes creating the substitute audio data portion by altering the original audio data portion.

Still further in accordance with a preferred embodiment of the present invention the modifying step includes altering the original audio data portion by adding a fullscale complement to the original audio data portion.

There is also provided in accordance with a preferred embodiment of the present invention a compact disc including at least one frame including modified audio data derived from a source audio data stream having at least one source audio data portion thereof the a derivative function of a sequence of samples of the source audio data portion is substantially constant and the source audio data stream has been modified by substituting the source audio data portion with a substitute audio data portion, and a P-channel that corresponds to the substitute audio data portion the P-channel has a value of 1.

There is additionally provided in accordance with a preferred embodiment of the present invention apparatus for preparing audio data prior to being recording onto a compact disc so as to discourage unauthorized copying thereof including intercept apparatus operative to sample a source audio data stream to determine at least one source audio data portion thereof the a derivative function of a sequence of samples of the source audio data portion is substantially constant, modify the source audio data stream by substituting the source audio data portion with a substitute audio data portion, and set a P-channel of a frame of the compact disc into which the substitute audio data portion is to be recorded to 1.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
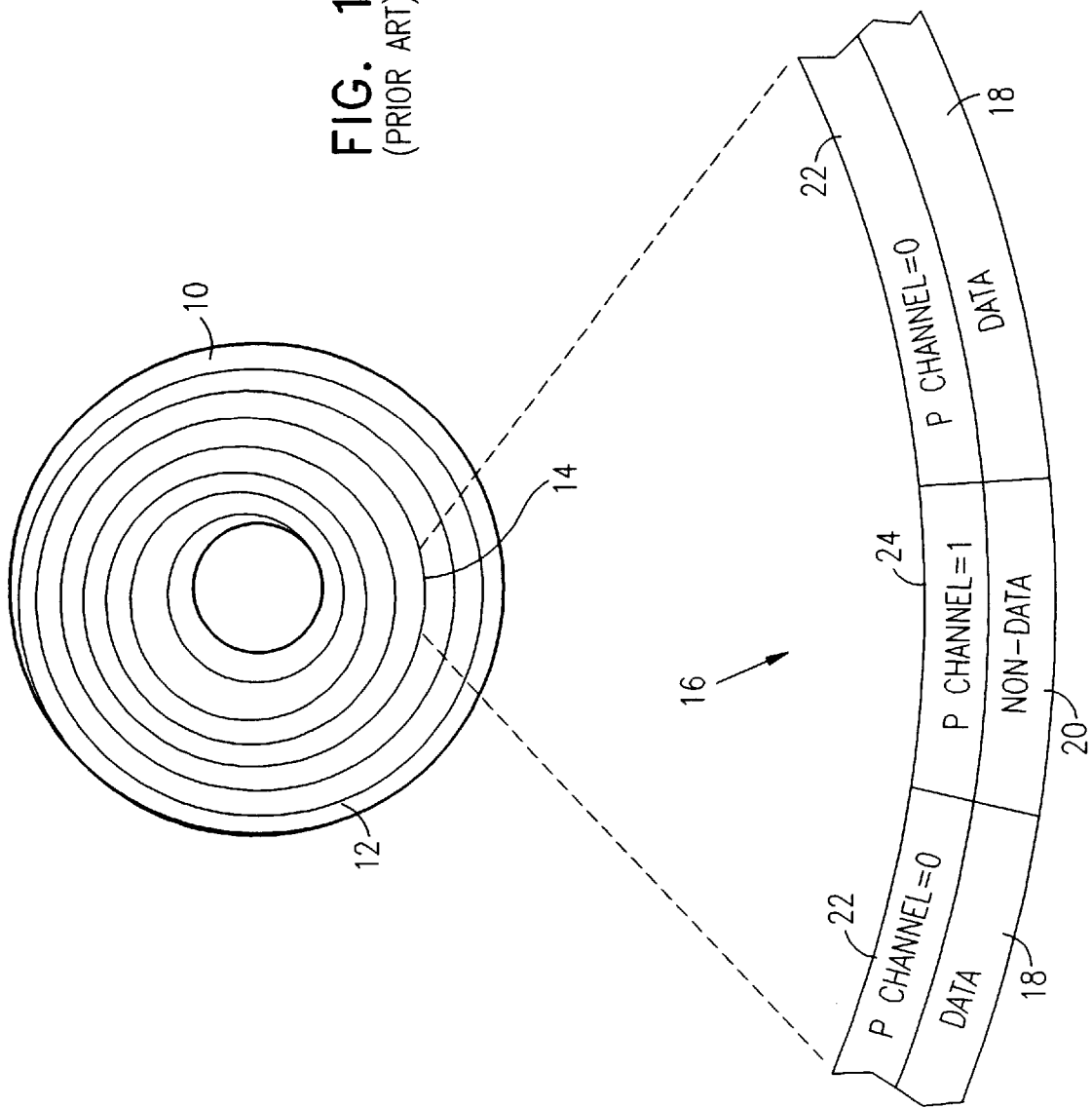
FIG. 1 is a simplified conceptual illustration of a prior art compact disc constructed and operative in accordance with International Electrotechnical Commission Standard No. 908 governing compact disc digital audio systems.

Reference is now made to FIG. 1 which is a simplified conceptual illustration of a prior art compact disc constructed and operative in accordance with International Electrotechnical Commission Standard No. 908 governing compact disc digital audio systems, herein referred to as "standard 908," the disclosure of which is hereby incorporated by reference. FIG. 1 shows a compact disc 10 having a spiral recording track 12 onto which audio and control data are recorded. A portion 14 of track 12 is shown enlarged at 16 where track 12 is shown as comprising data sections 18, where music or other audio data are recorded, as well as non-data sections 20 where control information is stored. In accordance with standard 908 a section of the track known as the P-channel is generally recorded with a value of 0 for data sections and 1 for non-data sections, as shown respectively by reference numerals 22 for data sections 18 and reference numeral 24 for non-data section 20. Regarding information recorded in a data section, standard 908 dictates that where the P-channel=0 the digital audio information may be passed to a digital-to-analog converter for output via a speaker, and where the P-channel=1 it may not.

Figure 2:
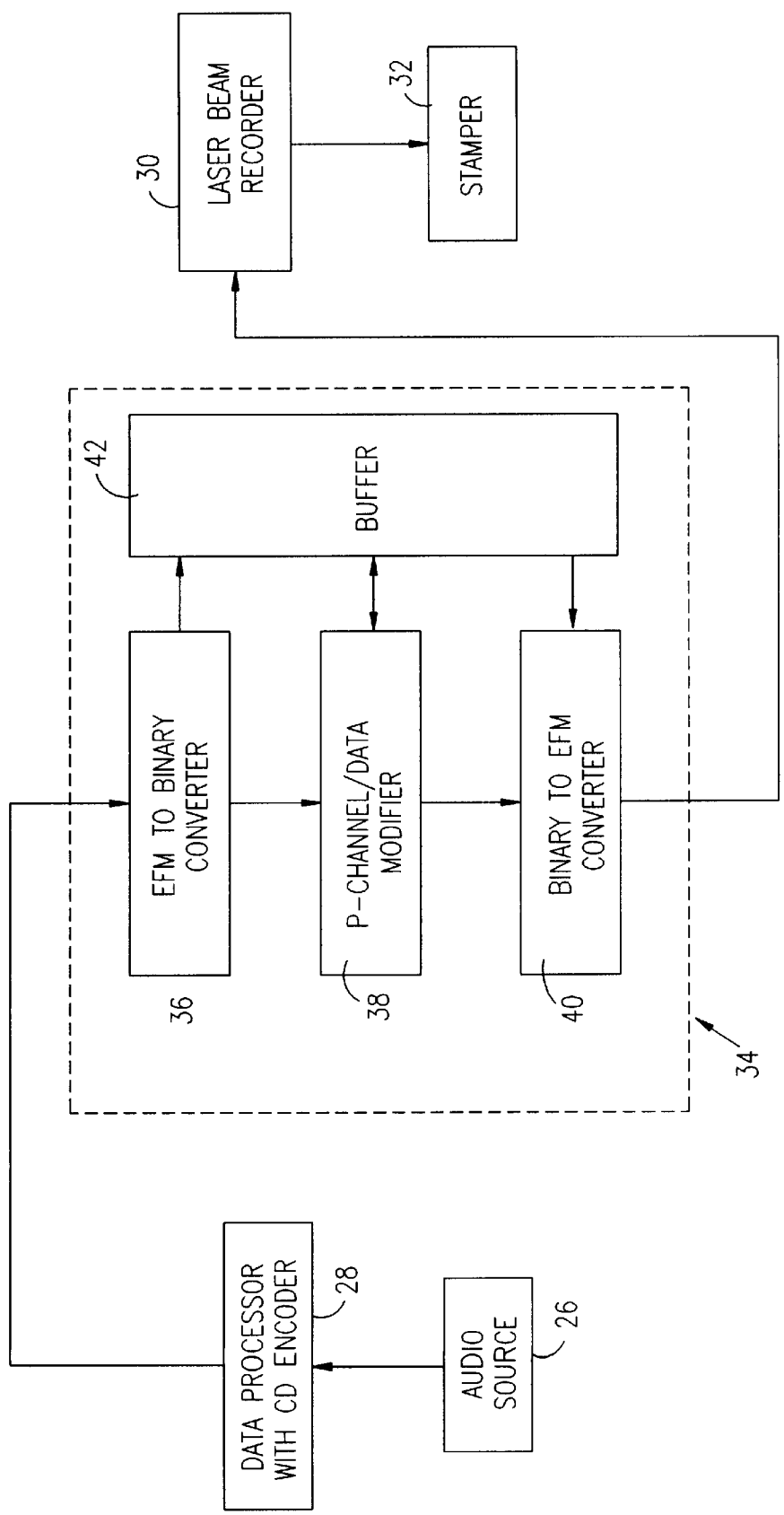
FIG. 2 is a simplified block diagram of a P-channel/audio data manipulation system constructed and operative in accordance with a preferred embodiment of the present invention.

Reference is now made to FIG. 2 which is a simplified block diagram of a P-channel/audio data manipulation system constructed and operative in accordance with a preferred embodiment of the present invention. As in prior art recording systems, an audio source 26 provides an audio signal input to a data processor 28 which typically includes CD encoding circuitry for preparing the audio signal to be recorded onto the surface of a compact disc in accordance with standard 908. In prior art systems the output from data processor 28 is typically input into a laser beam recorder 30 which in turn controls a stamper 32 for recording the prepared audio signal onto the CD. In accordance with the present invention intercept apparatus generally designated 34 intercepts the prepared audio output from data processor 28. Intercept apparatus 34 preferably converts the incoming eight-to-fourteen modulated (EFM) signal to a binary signal using a converter 36, and, at modification apparatus 38, modifies the audio data and corresponding P-channel using the method described in greater detail hereinbelow with reference to FIG. 3. The modified signal is then reconverted back to EFM using a converter 40 and input to recorder 30.

A buffer 42 may be used to buffer incoming audio data record blocks during processing. Preferably, a non-data block need not be buffered and may be immediately written out to recorder 30. Data block processing typically begins with buffering three data blocks. As a fourth data block is received and buffered, modification apparatus 38 retrieves the first data block from buffer 42 for processing. As the fifth data block is received and buffered, the now-processed first data block is sent to recorder 30 and modification apparatus 38 retrieves the second data block from buffer 42 for processing. This process continues until the next non-data block is received.

Figure 3:
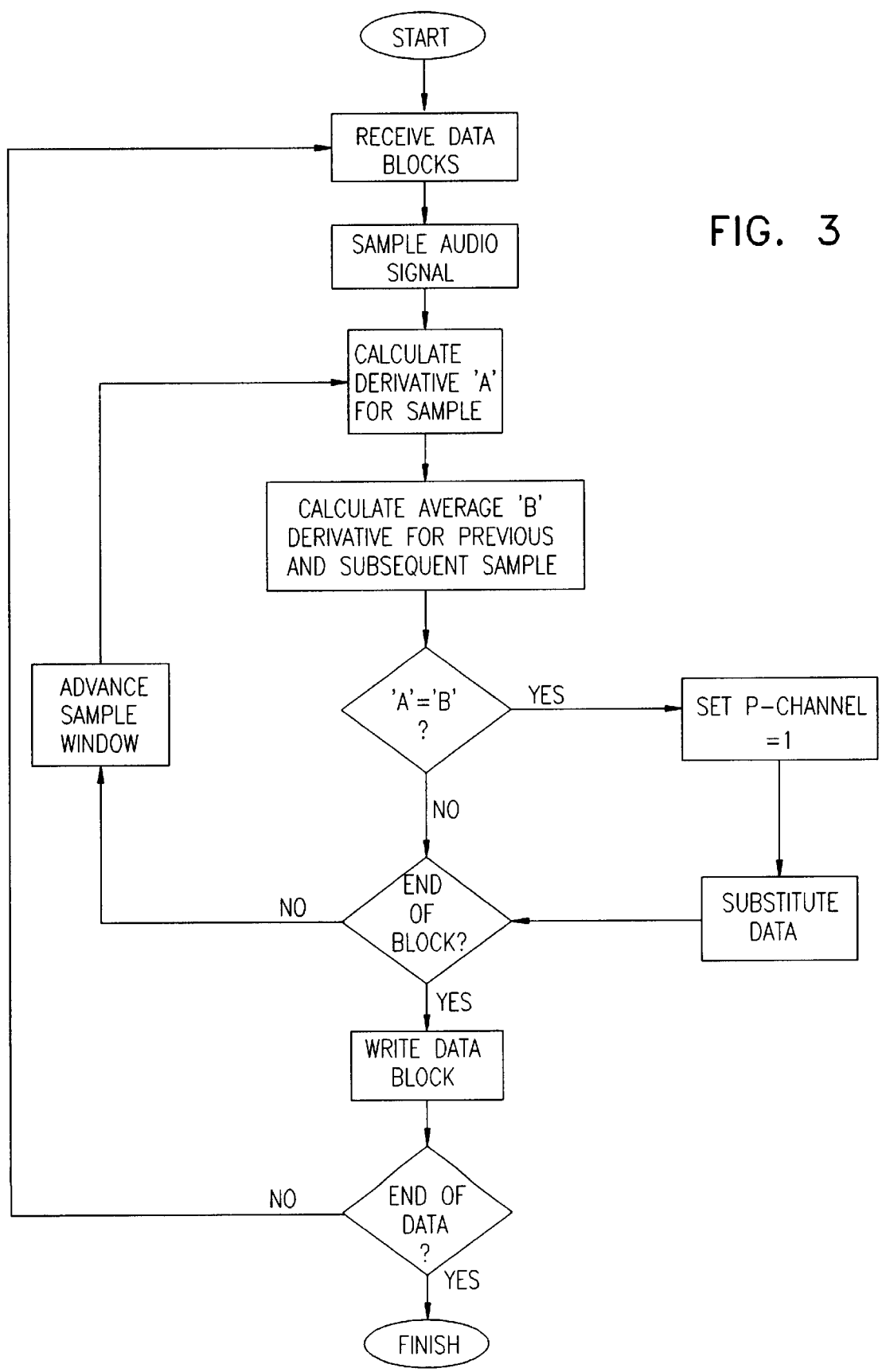
FIG. 3 is a simplified flowchart illustration of a method of operation of modification apparatus 30 of FIG. 2 operative in accordance with a preferred embodiment of the present invention.

Typical operation of modification apparatus 30 of FIG. 2 is now described with additional reference to FIG. 3. The method of FIG. 3 as described in detail hereinbelow is preferably implemented through the use of specialized software and/or hardware designed for that purpose using well-known techniques. In the method of FIG. 3 a data block representing a portion of a source audio data stream is received and N samples othe source audio data signal are taken, preferably 7 per block. For each sample n in N a derivative A is calculated using samples n−1 and n+1. An average B is then calculated from the derivatives for samples n−1 and n+1. The derivative A is then compared to the average B. Should A=B the P-channel corresponding to the sample is set to 1 and the source audio data is substituted with false data, preferably the fullscale complement to the sampled signal. After each data block is processed it is input to recorder 30 for stamping. Subsequent data blocks are similarly processed until a non-data block is encountered.

Figure 4A:
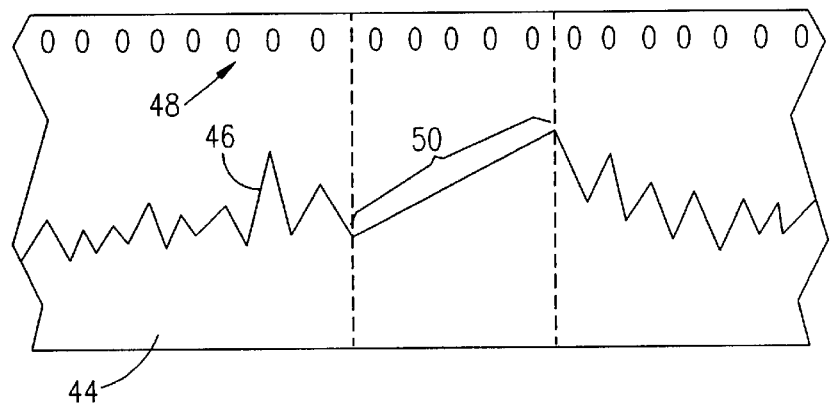
FIGS. 4A, 4B, and 4C are conceptual illustrations of an audio data portion of a CD track for a master CD (4A), a CD produced using the method of FIG. 3 (4B), and an unauthorized duplicate of a CD produced using the method of FIG. 3 (4C).
Figure 4B:
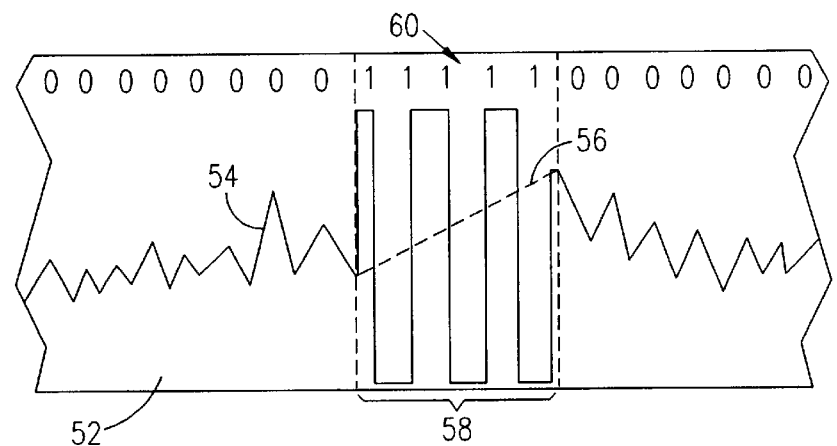
Figure 4C:
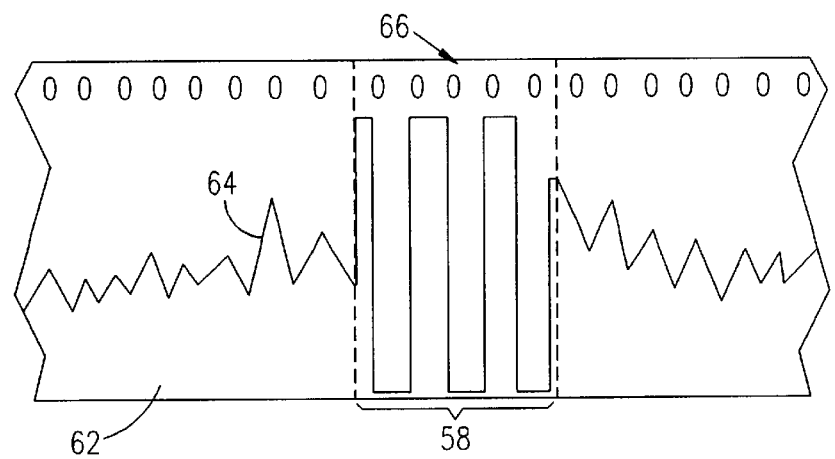

Reference is now made to FIGS. 4A, 4B, and 4C which are conceptual illustrations of an audio data portion of a CD track for a master CD (4A), a CD produced using the method of FIG. 3 (4B), and an unauthorized duplicate of a CD produced using the method of FIG. 3 (4C). In FIG. 4A a track portion 44 of a master CD is shown having an audio signal 46. A P-channel 48 is set to 0 as is required and expected of a standard 908 compliant CD. A portion 50 of signal 46, bounded by dashed lines, is shown as having a constant derivative. FIG. 4B shows a track portion 52 that corresponds to track portion 44 of a CD produced using the method of FIG. 3 above. An audio signal 54 is shown that generally corresponds to signal 46 with the notable exception that portion 50, represented by a dashed line 56, has been substituted with a substitute audio data portion 58, and the portion 60 of the P-channel that corresponds to portion 58 has been set to 1.

As was mentioned above, it is a particular feature of standard 908 that where the P-channel=1 in a data section, the corresponding digital audio information may not be passed to a digital-to-analog converter for output via a speaker. Rather, under such circumstances standard 908 dictates that an interpolation be made between the last valid datum where the P-channel=0 and the next valid datum. The interpolated information is then passed to the digital-to-analog converter and output via the speaker. Thus, the substitute audio data portion 58 of FIG. 4B is ignored, and instead an interpolation, substantially equivalent to the original portion 50 of FIG. 4A, is output, thus resulting in little or no net difference in audio quality between the corresponding track port 44 and 52 of FIGS. 4A and 4B.

FIG. 4C shows a track portion 62 of an unauthorized duplicate of a CD produced using the method of FIG. 3. Track portion 62 corresponds to track portion 52 of FIG. 4B. While an audio signal 64 is identical to audio signal 54 of FIG. 4B, the portion 66 of the P-channel that corresponds to portion 58 has been set to 0. This is because standard 908-compliant CD encoding circuitry does not directly provide for the copying of the P-channel from a source CD that is being duplicated. Rather, the CD encoding circuitry itself decided when and how to set the P-channel. During duplication the CD encoding circuitry merely sets the P-channel=0 while recording to the data are, and therefore the P-channel setting of portion 60 is ignored. Thus, during playback, the substituted audio data portion 58 is provided to the digital-to-analog converter as normal data, resulting in audio distortion and potentially damaging the output circuitry.

It is appreciated that the steps of the methods described hereinabove need not necessarily be performed in the order shown, and that in fact different implementations of the steps may be employed to yield similar overall results.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A compact disc comprising:

at least one frame comprising:
modified audio data derived from a source audio data stream having at least one source audio data portion thereof wherein a derivative function of a sequence of samples of said source audio data portion is substantially constant and wherein said source audio data stream has been modified by substituting said source audio data portion with a substitute audio data portion; and
a P-channel that corresponds to said substitute audio data portion wherein the P-channel has a value of 1.

2. Apparatus for preparing audio data prior to being recording onto a compact disc so as to discourage unauthorized copying thereof comprising:

intercept apparatus operative to sample a source audio data stream to determine at least one source audio data portion thereof wherein a derivative function of a sequence of samples of said source audio data portion is substantially constant, modify said source audio data stream by substituting said source audio data portion with a substitute audio data portion, and set a P-channel of a frame of said compact disc into which said substitute audio data portion is to be recorded to 1.

3. A method for recording audio data onto a compact disc so as to discourage unauthorized copying thereof, the method comprising:

sampling a source audio data stream to determine at least one source audio data portion thereof wherein a derivative function of a sequence of samples of said source audio data portion is substantially constant;

modifying said source audio data stream by substituting said source audio data portion with a substitute audio data portion;

recording said modified audio data stream into at least one frame of said compact disc wherein said frame has a P-channel; and setting the value of said P-channel that corresponds to said substitute audio data portion to 1.

4. A method according to claim 3 wherein said modifying step comprises creating said substitute audio data portion by altering said original audio data portion.

5. A method according to claim 4 wherein said modifying step comprises altering said original audio data portion by adding a fullscale complement to said original audio data portion.

* * * * *